(12) United States Patent
Wong

(10) Patent No.: US 7,644,506 B2
(45) Date of Patent: Jan. 12, 2010

(54) EDGE LEVEL WITH SIDE MAGNETS AND VELCRO(HOOK AND LOOP FASTENER)

(76) Inventor: Harry Wong, 507 Camino Verde, South Pasadena, CA (US) 91030

( * ) Notice: Subject to any disclaimer, the term of this patent is extended or adjusted under 35 U.S.C. 154(b) by 115 days.

(21) Appl. No.: 12/031,047

(22) Filed: Feb. 14, 2008

(65) Prior Publication Data

US 2009/0205214 A1    Aug. 20, 2009

(51) Int. Cl.
*G01C 9/00* (2006.01)
(52) U.S. Cl. .......................... 33/373; 33/347
(58) Field of Classification Search .................. 33/373, 33/347, 370, 371, 372
See application file for complete search history.

(56) References Cited

U.S. PATENT DOCUMENTS

| | | | | |
|---|---|---|---|---|
| 2,535,791 A * | 12/1950 | Fluke | ........................... | 33/347 |
| 3,707,772 A * | 1/1973 | Cotter | ........................... | 33/373 |
| 3,826,013 A * | 7/1974 | Baher | ........................... | 33/390 |
| 4,531,301 A * | 7/1985 | Tau | ........................... | 33/382 |
| 4,593,475 A * | 6/1986 | Mayes | ........................... | 33/347 |
| 4,663,856 A * | 5/1987 | Hall et al. | ........................... | 33/373 |
| 5,421,094 A * | 6/1995 | McCord et al. | ........................... | 33/373 |
| 6,029,359 A * | 2/2000 | Szumer | ........................... | 33/373 |
| 6,332,277 B1 * | 12/2001 | Owoc et al. | ........................... | 33/373 |
| 6,502,322 B2 * | 1/2003 | Smochek | ........................... | 33/373 |
| 7,089,676 B2 * | 8/2006 | Godinez | ........................... | 33/371 |
| 7,117,606 B2 * | 10/2006 | Brown | ........................... | 33/365 |
| 2008/0271331 A1 * | 11/2008 | Allemand | ........................... | 33/371 |

* cited by examiner

*Primary Examiner*—Christopher W Fulton
(74) *Attorney, Agent, or Firm*—Jen-Feng Lee, Esq.

(57) ABSTRACT

Present invention provides an edge level that can be used for measuring angles or levelness on all X, Y and Z axis simultaneously and in hands-free type operation, due to the use of Velcro or external clamps used together with the features introduced herein. A removable pod, containing the Z-axis bubble, provides the flexibility of insertion to the pod seat for measuring Z-axis angle and can be stored or put aside when not in use.

4 Claims, 6 Drawing Sheets

EDGE LEVEL WITH SIDE MAGNETS AND VELCRO(HOOK AND LOOP FASTENER)

FIELD AND BACKGROUND OF THE INVENTION

The present invention relates generally to an edge level having 3-dimensional axis bubbles, permanent magnets and special clamping features that make it easy for all kinds of use.

People need to use edge levels, sometimes called bubble levels, for gauging and measurement, in architectural design, mechanical installation, wood work, and any kind of engineering endeavors. Bubble levels are thus made to contain a chamber wherein some amount of air resides in a liquid (usually water) so that the air bubble's position would indicate the degree of levelness when measurement is taken.

Edge levels having multiple degree indicators are available on the market. However, the prior art edge levels lack the feature of easy stick-on or clamp-on to the objects being measured. This lack of easy clamp-on causes some inconvenience to users of edge levels, since at least a user's hand needs to hold the edge level, restricting the user freedom when working.

OBJECTS AND SUMMARY OF THE INVENTION

Present invention provides an edge level that measures the four (4) most encountered angles (0, 30, 45, 90) and is easy to stick on to or clamp on to the surface of an object being measured upon, resulting in hands-free operation of the edge level and greater convenience.

The embodiment of present invention contains a main body, a 0-degree bubble, 30-degree bubble, 45-degree bubble, a 90-degree bubble, a central pod seat for insertion of a Z-axis bubble pod and a plurality of holes allowing the use of other clamping tools for attaching edge level (by clamping through the holes) to object being measured upon.

Additionally, some permanent magnets are mounted on the sides of the main body, for attaching to iron or magnetic surface of object. The present invention additionally includes a length of VELCRO (hook and loop fastener) that can be used to tie the main body to object being measured upon, with or without looping through the holes.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 1:
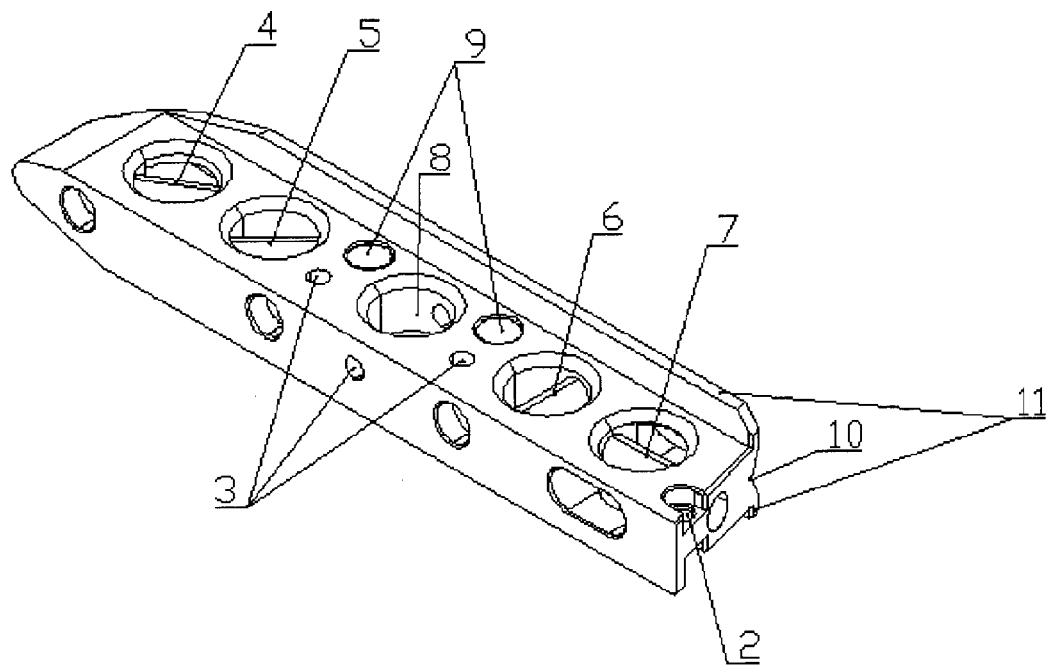
FIG. 1 shows overall structure of the edge level pursuant to disclosure herein.
Figure 2:
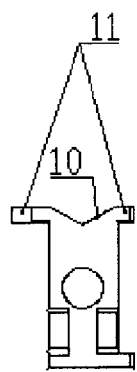
FIG. 2 shows the right-side view of the edge level pursuant to disclosure herein.
Figure 3:
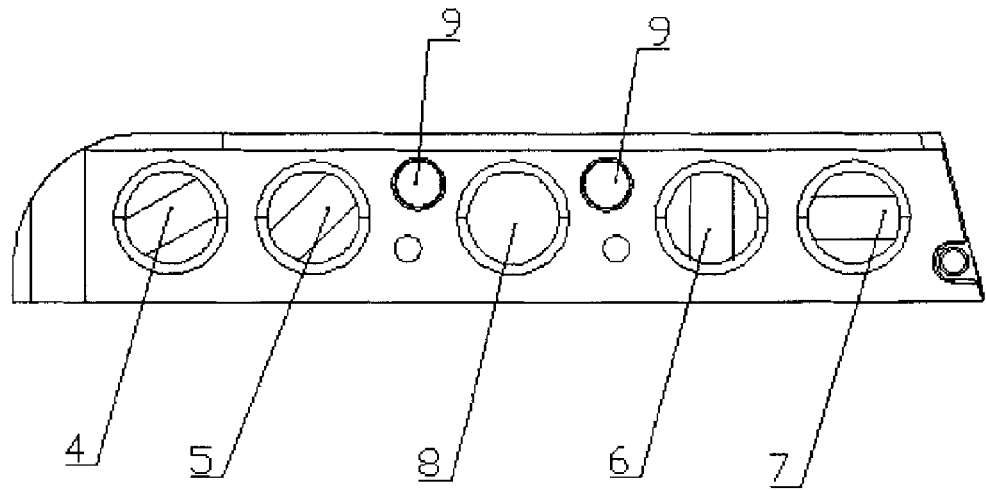
FIG. 3 shows the front side view of the edge level pursuant to disclosure herein.
Figures 4, 5:
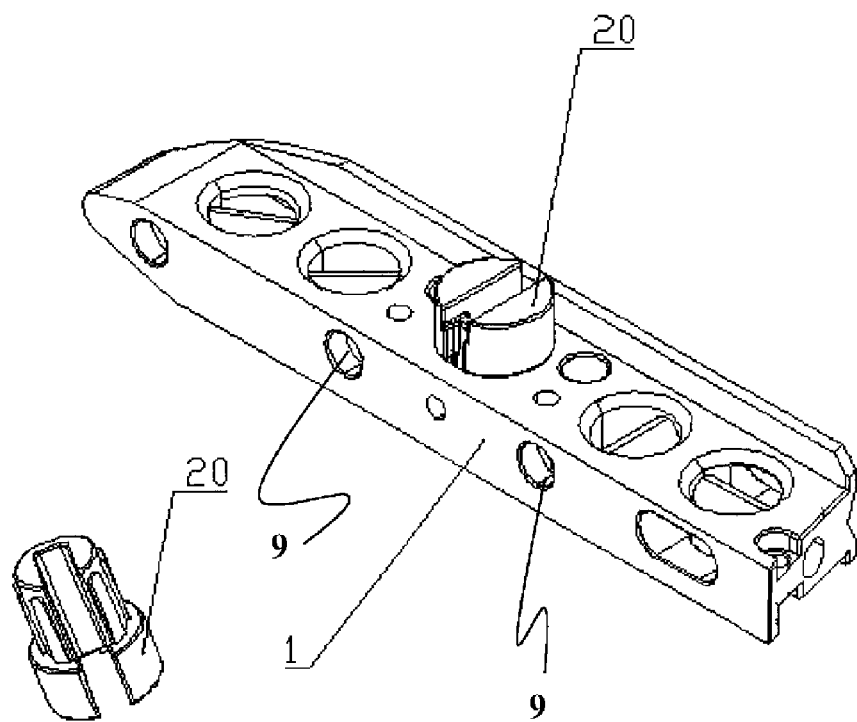
FIG. 4 shows an additional connector rod for receiving or latching to other clamping tool or device.
FIG. 5 shows connector rod being inserted into pod seat on the level body.

In FIGS. 1-3, four (4) bubbles of 0, 30, 45 and 90 degrees are shown, having numbers 7, 4, 5 and 6 respectively. They are used to easily gauge the angles of object for the stated degrees.

A side hole 2 is made to one side of level body 1 so that a string or other small hook-type apparatus can be looped through this side hole 2 for storage of present edge level when not in use. In additional to side hole 2, one or more holes can be made on level body 1, so that VELCRO (hook and loop fastener) or other clamping tools can loop through or string through these holes, for purpose of attaching present invention to objects being measured upon. Some thread lines can be made to the inside wall of these additional holes, facilitating tight and secure attaching if clamping tools have matching thread lines.

Four permanent magnets 9 are located on two surfaces, two on each side, of level body 1, so that present edge level can be magnetically attached to a measured object when such object contains magnetic attribute.

A V-groom 10 is formed on one side of level body 1 so that, when this V-groom 10 is sticking to an edge on a measured object, the groom shape provides better and more stable contact between the edge level and the object being measured upon, regardless of the angle being chosen.

Figures 6, 7:
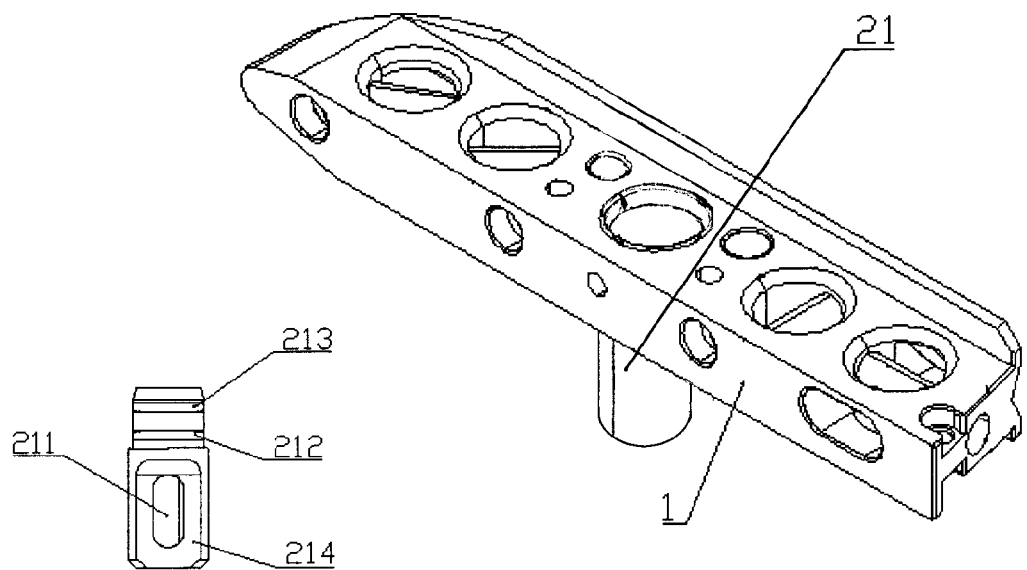
FIG. 6 shows bubble pod.
FIG. 7 shows edge level with bubble pod inserted in place.

FIG. 6 shows the pod 21 for insertion into level body 1, forming Z-axis level indicator. The insertion is shown in FIG. 7.

Pod 21 contains pod stem 214, bubble chamber 211, rubber rings 212 and 213. When pod stem 214 is inserted into pod seat 8, bubble chamber 211 is in perpendicular relationship to bubbles 4, 5, 6 and 7, as shown in FIGS. 6 and 7.

Figure 8:
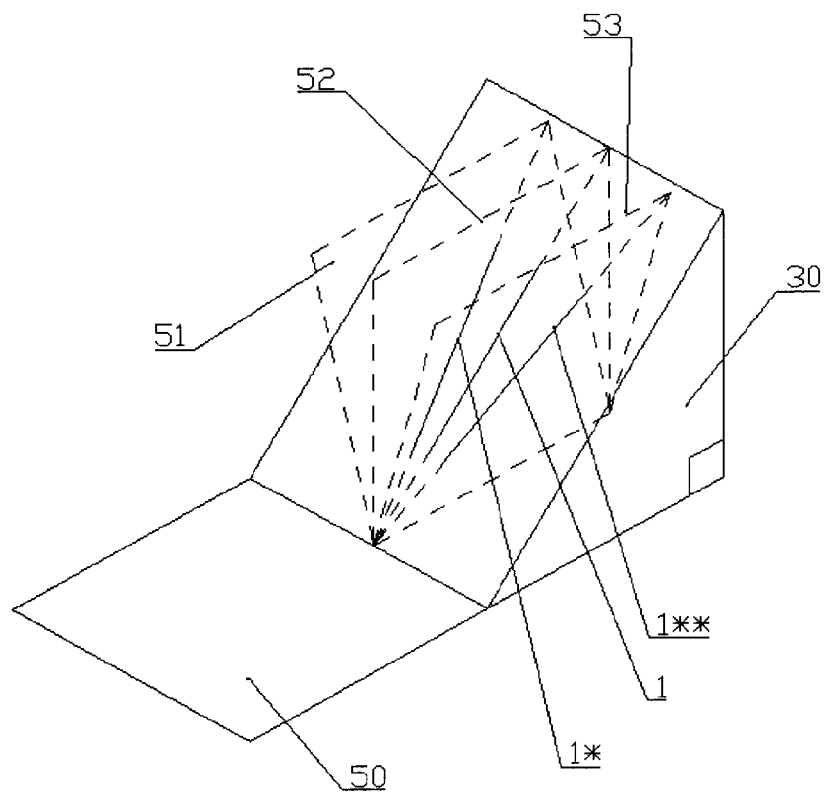
FIG. 8 shows the use of the edge level pursuant to disclosure herein helps the alignment of object to the perpendicular plane when measured upon.

One advantage of present invention is shown in FIG. 8, where the measured object 30, being placed on a horizontal surface 50, is being gauged by an edge level of present invention. If the level body 1 does not align to the perpendicular surface 52, but instead leans to either slanting surface 51 or 53, the bubble readout would not be correct. Pod 21, containing Z-axis readout, helps to insure that level body 1, when placed on the sloppy side of object 30, will be aligned to the perpendicular surface 52, and will not lean towards surface 51 or 53.

Figure 9:
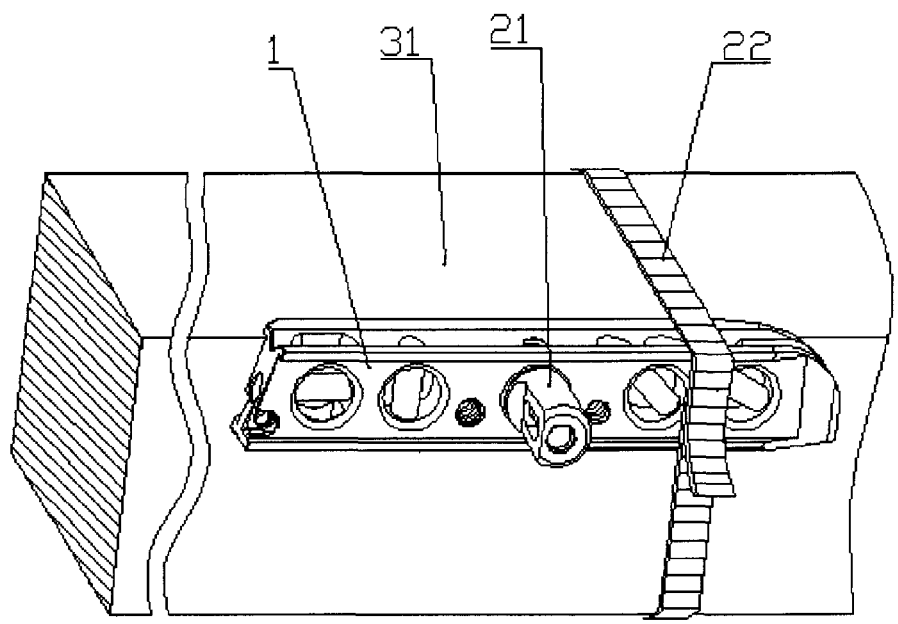
FIG. 9 shows the use of edge level with VELCRO (hook and loop fastener) while bubble pod is in place.

The additional feature of VELCRO 22 (hook and loop fastener) 22 allows, as shown in FIG. 9, the hands-free operation of present edge lever, when the Velcro, along with the wing 11, securely fixes the edge level to object 31, with desired angle(s) being of Z, Y and Z axis readable at the same time.

Figure 10:
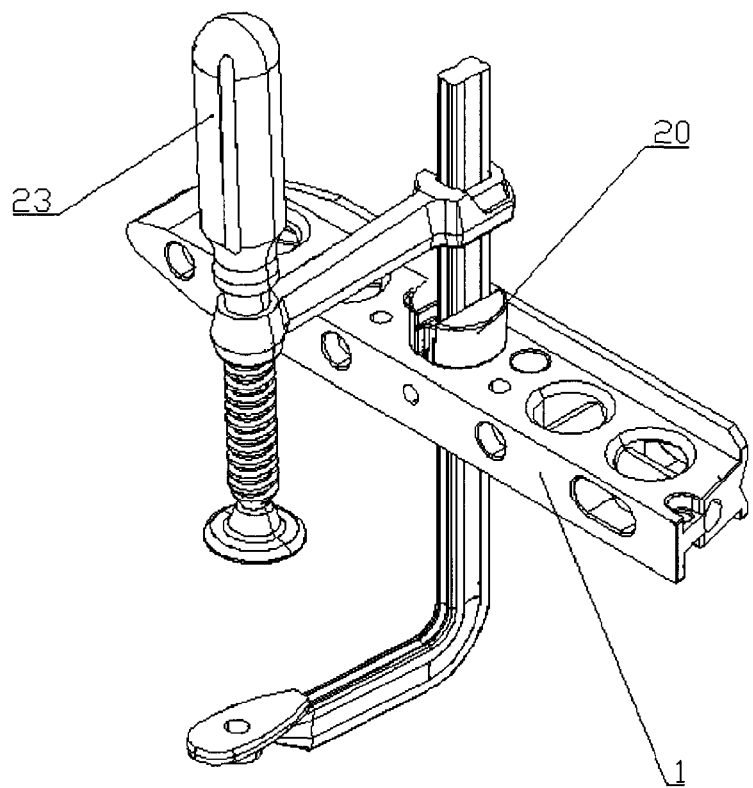
FIG. 10 shows the use of edge level along with a clamp.

In FIG. 10, clamping tool 23 can work with level body 1 by latching onto the pod seat 8, by an additional connector rod 20 sized to fit pod seat 8 and has an inside opening for receiving/latching clamping tool 23 or other devices.

Figure 11:
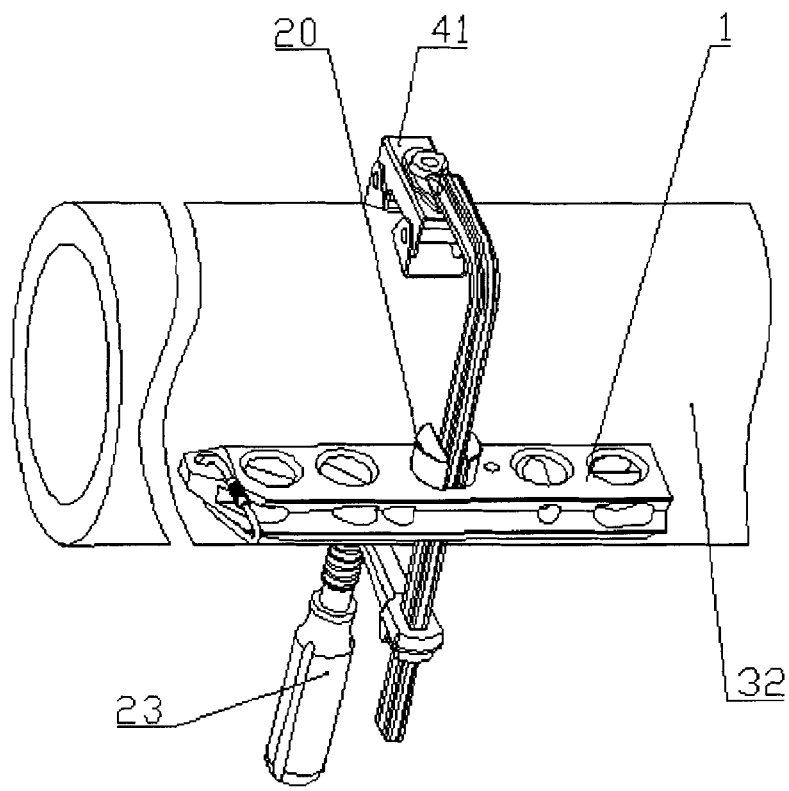
FIG. 11 shows another use of present edge level along with other grasp piece.

In FIG. 11, auxiliary grasp piece 41 can be used in conjunction with edge level of present invention to provide ease of use on objects of different shapes, when a clamping device can be secured through connector rod 20, to the object 32 being measured upon.

Figure 12:
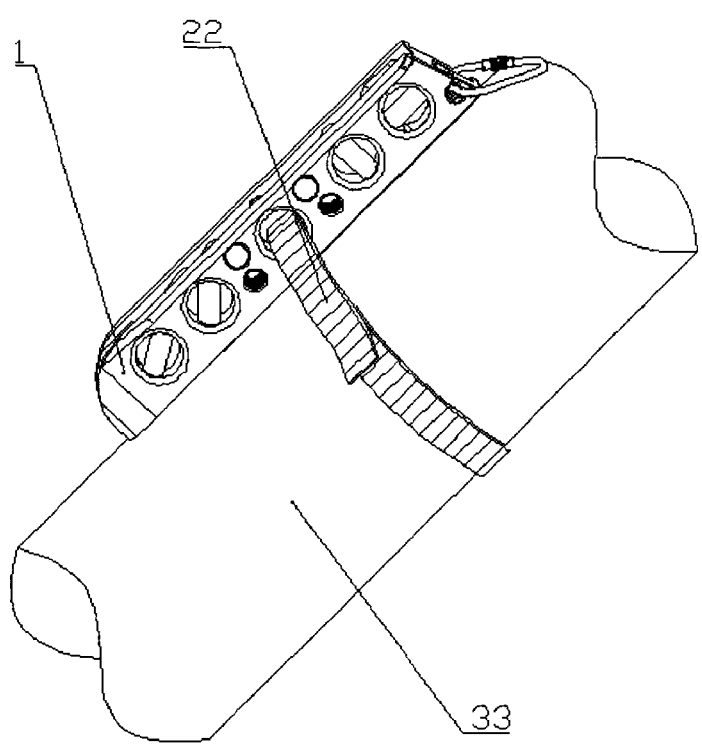
FIG. 12 shows use of edge level having VELCRO (hook and loop fastener) stringing through the pod seat.

In FIG. 12, VELCRO 22 (hook and loop fastener) is shown to string through pod seat 8 and secures level body 1 onto the surface of the object 33 being measured upon.

Figure 13:
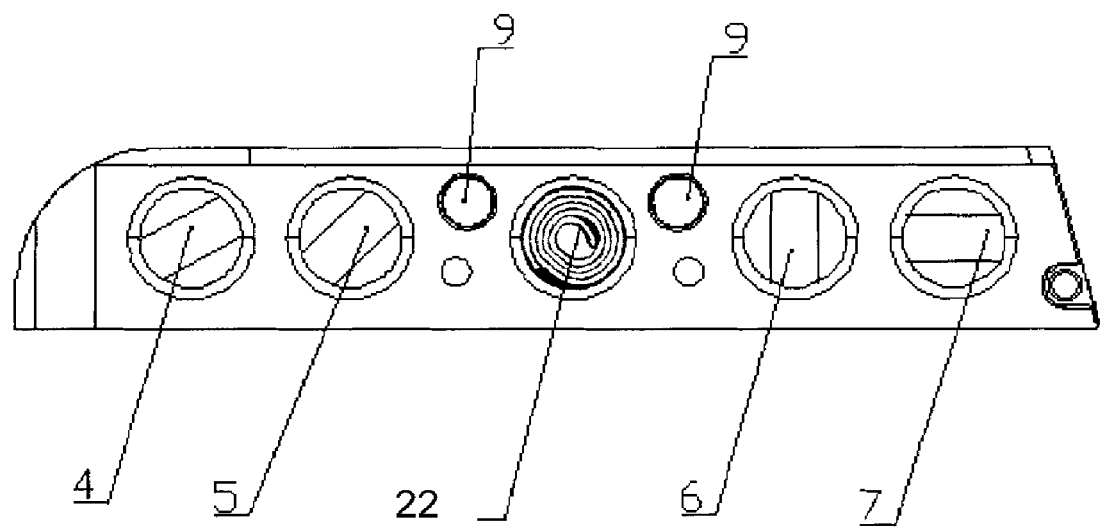
FIG. 13 shows the storage of VELCRO (hook and loop fastener) in pod seat when not in use.

In FIG. 13, VELCRO 22 (hook and loop fastener) is stored into the pod seat 8, for easy put-away.

What is claimed is:

1. An edge level having 3-dimensional bubbles covering X, Y and Z axis, comprising:
   a. level body having four bubble chambers for 0, 30, 45 and 90 degree;
   b. a pod for fitting into a pod seat formed on the level body, said pod forming Z-axis indicator and containing rubber rings on pod stem for secure and non-slip insertion into pod seat;
   c. two wings extending out from the full length of level body, forming two window-ledge type angled surface;
   d. a plurality of magnets on two perpendicular sides of level body; and,
   e. a VELCRO strip of about suitable length that can be curled into a ball for stored into the pod seat on the level body.

2. An edge level of claim 1, further comprising:
   a. a V-groom formed on one side of and along the full length of level body creating a receiving slot for easy alignment of and close contact with objects being measure upon.

3. An edge level of claim 1, further comprising:
   a. a plurality of holes through the level body with thread lines made to the inside cylindrical walls for easy coupling with other tools or for clamping.

4. An edge level of claim 1, further comprising:
   a. a connector rod sized to fit pot seat and contains inner opening for holding or latching on clamping tool or other devices.

* * * * *